ELECTRICAL REGULATING CIRCUITS

Filed June 23, 1953

INVENTOR
BEN HALE BURDGE
BY Elmer J. Gorn
ATTORNEY

United States Patent Office 2,774,032

Patented Dec. 11, 1956

2,774,032

ELECTRICAL REGULATING CIRCUITS

Ben Hale Burdge, Lexington, Mass., assignor to Raytheon Manufacturing Company, Newton, Mass., a corporation of Delaware Application June 23, 1953, Serial No. 363,515

6 Claims. (Cl. 323—22)

This invention relates to electrical circuits for stabilizing the output of load devices and more particularly to the output of such non-linear load devices generally referred to as magnetrons.

In the operation of magnetrons and similar devices, it is frequently necessary to prevent changes in the operating mode. It has been shown that reduction of voltage across the load will correct such moding. However, where a normally constant current supply is demanded, no method has been described to keep the voltage below the level which would result in moding.

The present invention describes a system which maintains constant current through a load but which is automatically converted into a constant voltage system when the load voltage reaches a predetermined maximum. This conversion into a constant voltage system is accompanied by a sharp drop in current which does not rise again until the voltage drops below its predetermined level.

In accordance with this invention, a positive current source, such as a rectified alternating voltage source, is placed in series with the load, a resistance, and electronic means responsive to circuit parameters. The electronic means includes an electronic control tube having a grid whose fixed potential is supplied by an independent D. C. source and whose control potential is supplied by both a constant current control circuit and a maximum voltage control circuit.

The constant current control circuit includes an electronic amplifier whose plate circuit connects with the grid of the electronic control tube and whose own grid is at a negative bias to its cathode and taps the load circuit. The amplifier cathode is supplied with a potential which varies directly as the load voltage less the change in potential drop across the aforesaid resistance. The grid bias is arranged so as to be a direct function of the load current. As the load current varies, the information is passed by the constant current control circuit to the grid of the control tube which in turn adjusts the load current.

The maximum voltage control circuit is also connected to both the load circuit and the principal control grid. This voltage circuit contains an electronic amplifier which has a grid normally biased beyond cut-off. This grid is connected to the load circuit. The amplifier cathode potential is arranged so as to vary directly as the load voltage. The grid bias can be arranged so as to be a direct function of load voltage alone or can be also made partially dependent on load current. By proper choice of resistance values, the amplifier will conduct only when the load voltage reaches the predetermined maximum value. The resultant current in the supply circuit for the grid of the control tube acts to prevent further increase in load voltage.

Figure 1:
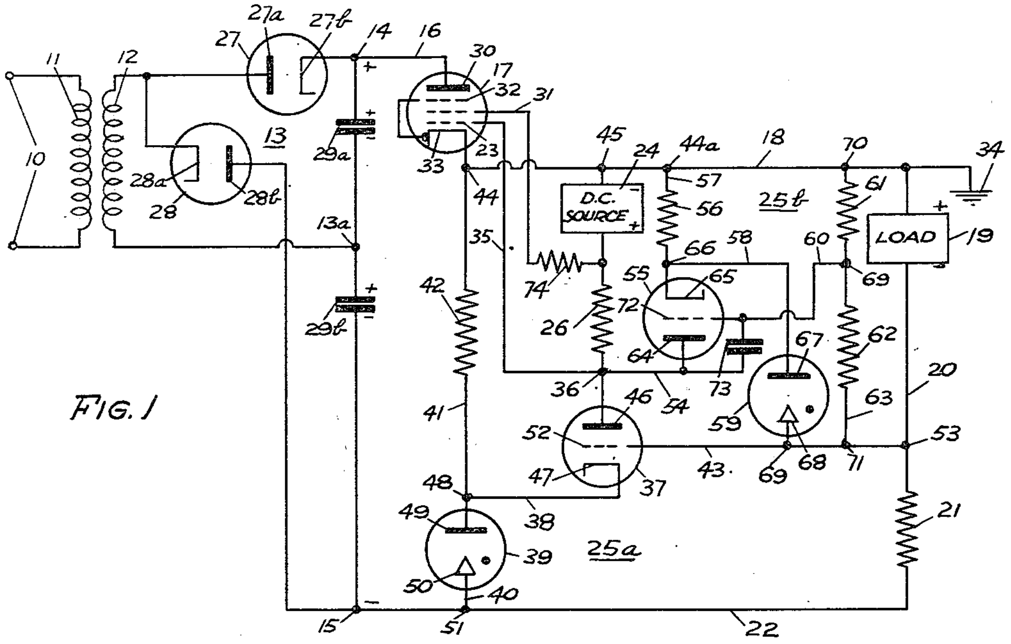
Figure 2:
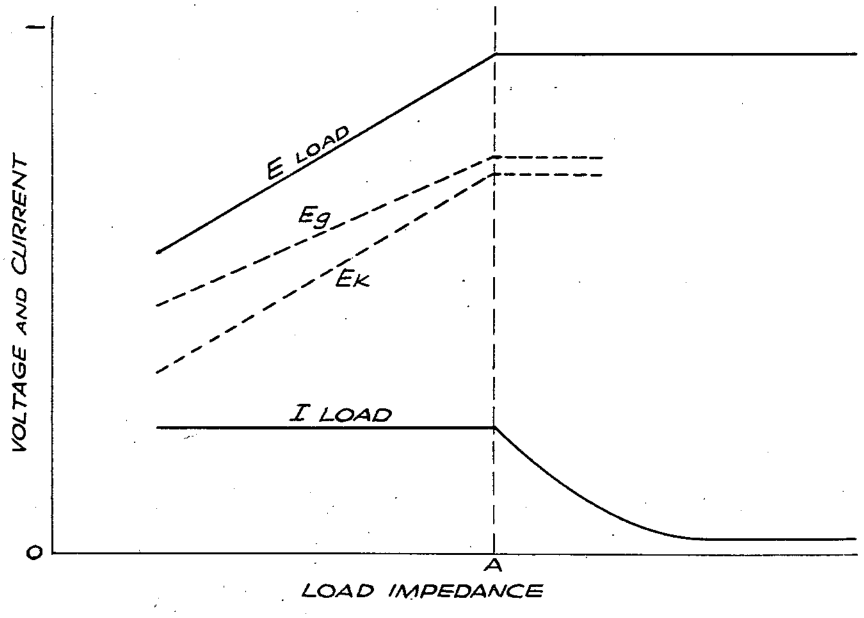

This invention will be more clearly understood by reference to a preferred embodiment in which:

Figure 1 is a partially schematic and block diagram of a circuit made in accordance with this invention; and Figure 2 is a graph illustrating the relation between load voltage, load current and load impedance.

Referring now more particularly to Figure 1 of the accompanying drawings, the numeral 10 refers to a source of alternating voltage which is applied to a primary winding 11. Current flowing in the primary 11 induces an alternating current in a secondary winding 12 cooperating therewith. This latter alternating current is in turn applied to the input junctions of a voltage-doubler rectifier circuit 13 having output junctions 14 and 15. The rectified output is taken from the positive output junction 14 and applied to a load 19 via a conductor 16, a vacuum pentode 17, and another conductor 18. A conductor 20, a resistance 21, and another conductor 22, complete the load circuit back to negative output junction 15. The load 19 can be a non-linear electron-discharge device, such as a magnetron.

The pentode 17 has a principal control grid 23 whose potential is derived from a circuit containing a fixed, positive D. C. source 24, a current regulating circuit 25A, a maximum voltage circuit 25B, and a resistance 26.

The details of this embodiment are as follows. The rectifier circuit comprises two vacuum diodes 27 and 28, with a plate 27A of diode 27 being connected to the cathode 28A of diode 28 and to the secondary 12. The other end of the secondary 12 is connected to a junction 13A between two condensers 29A and 29B. The cathode 27B of diode 27 is connected to the positive output junction 14, while the plate 28B of diode 28 is connected to the negative output junction 15.

The pentode 17 contains a principal control grid 23, a plate 30, a screen grid 31, and a suppressor grid 32 and cathode 33.

The cathode 33 is kept at ground potential via conductor 18 and ground tap 34. The principal control grid 23 is connected via conductor 35 to a junction 36 at which interconnect the fixed grid potential circuit, the constant current control circuit and the maximum voltage control circuit.

The constant current control circuit 25A comprises vacuum triode 37, conductor 38, gaseous diode 39, conductor 40, conductor 41, and resistance 42, as well as grid conductor 43. The operative flow of current for the triode 37 can be considered as flowing from positive input junction 14, through pentode 17 to junction 44, along conductor 18 to junction 45, across D. C. source 24, through resistance 26 to junction 36, to plate 46, across to cathode 47, to junction 48, to plate 49, across to cathode 50, down conductor 40, to junction 51, and thence to the negative output terminal 15. The control of the triode 37 is exercised by its grid 52 whose potential is fed by conductor 43, from junction 53, in conductor 20.

The maximum voltage circuit 25B includes conductor 54, triode 55, resistance 56, conductor 57, conductor 58, diode 59, conductor 60, resistance 61, resistance 62, and conductor 63. The operative flow of current through triode 55 can be considered as flowing from positive output terminal 14, through pentode 17, to junction 44, along conductor 18, to junction 45, across D. C. source 24, through resistance 26, to junction 36, along conductor 54, to plate 64, across to cathode 65, to junction 66, along the conductor 58, to plate 67, across to cathode 68, to junction 69, thence along conductor 43, to junction 53, through resistance 21, and conductor 22, to the negative output terminal 15. The grid supply for this triode 55 is obtained from junction 69, in the load-shunting grid supply circuit which comprises resistances 61 and 62, and conductor 63, and which is connected at junction 70, to conductor 18, and at junction 71, to conductor 43. The grid 72 of triode 55 has a condenser 73 connected between it and the plate 64, which acts as a parasitic suppressor.

The screen grid 31 is connected through resistance 74 to the positive side of the D. C. source 24.

In normal operation of this circuit, the component values are so chosen that triode 37 is conductive whereas triode 55 is not. Therefore, under these conditions it is only the current flow through triode 37, which acts to regulate the potential on the principal control grid 23. Thus, if there is a small increase of current through the load 19, by reason of a decrease in load impedance, then there is in turn an increased drop in potential across resistance 21, which is reflected through the diode 39, to give a drop in potential of cathode 47 with respect to grid 52. This is so since the grid bias on tube 37 is equal to the grid potential less the cathode potential which in turn is expressed by $I_L R^{21}—E_{39}$, in which $I_L$ is load current, $R_{21}$ is resistance 21, $E_{39}$ is the potential across gaseous diode 39. The gaseous diode potential $E_{39}$ is contant so that tube 37 responds directly to changes in load current.

As the grid 52 becomes less negative with respect to cathode 47, there is an increase in flow through triode 37, which increases the negative potential across resistance 26, opposing the D. C. source 24, with a resultant effect of making the control grid 23 more negative and hence decreasing the load current. This is the normal control phenomenon until the load voltage reaches the predetermined maximum at which triode 55 becomes conductive.

When triode 55 becomes conductive the current flowing through the triode 55 increases the negative potential opposing D. C. source 24, so that the control grid 23 is now driven negative, sharply cutting down the flow of current through the pentode. Incremental voltage changes on the load are now controlled by the grid 72, which acts to stabilize the load voltage.

The grid bias on triode 55 is expressed by $$\frac{R_{62}}{R_{61}+R_{62}}E_L - E_{59}$$

where $R_{61}$ is resistance 61, $R_{62}$ is resistance 62, $E_L$ is load voltage and $E_{59}$ represents the constant voltage across gaseous diode 59.

In general, as the impedance on the load increases, the load current tends to decrease so that the drop across resistance 21 will be less in magnitude and tend to make the triode grid 52 more negative. As this grid becomes more negative, the current through the tube decreases so that the drop across resistance 26 is less and the principal control grid is driven in a positive direction, causing a restoration of load current. When the voltage circuit is conductive, the load voltage tends to increase as the load impedance increases. When this happens, the grid bias on tube 55 increases in a positive direction and hence the current flow increases through the triode 55. This increase in current flow increases the potential drop across resistance 26 so that the control grid 23 is now driven in a negative direction, causing a further decrease in load current and a restoration of load voltage.

It should be noted that the gaseous diodes 39 and 59 are constantly conductive as long as there is any current flow through pentode 17. The path for diode 39 can be considered as running from positive output terminal 14, through tube 17, to resistance 42, conductor 41, through diode 39, conductor 40, and back to negative output terminal 15. Likewise diode 59 is fed from positive output 14, through pentode 17, to junction 44, across conductor 18, to junction 44A, thence through conductor 57, resistance 56, junction 66, conductor 58, through diode 59, to junction 69, across conductor 43, to junction 53, thence through resistance 21, through conductor 22, to negative output terminal 15. The function of each of these gaseous diodes is to provide a constant voltage which combines with potential from the load circuit in influencing the flow through triodes 37 and 55.

In Figure 2 are illustrated plots of load voltage $E_L$ and load current $I_L$ against load impedance. The load voltage $E_L$ rises in the useful load range while the load current $I_L$ remains constant. The potential $E_g$ on grid 72 and the potential $E_k$ on cathode 65 tend to converge at point "A" in Figure 2 so that at point "A" and above there is conduction across tube 55. This conduction converts the system to a constant maximum voltage system and produces a sharp drop in load current as the impedance increases. The grid bias in tube 55 is equal to $E_g—E_k$. $E_k$ is equal to $E_L$ less the constant drop across the diode, so that $E_k$ varies directly as $E_L$. The change in $(E_g—E_k)$ is equal to the change in $E_L$ multiplied by the value of resistance 62 and divided by the sum of the values of the resistances 61 and 62. Thus, critical point A may be varied by adjusting the ratio of resistance 61 to resistance 62.

Another possible embodiment of this invention would consist of tying in conductor 63, along resistance 21, instead of at junction 71. This sort of connection would make the maximum load voltage level a partial function of the load current, with the result that the voltage on the load, instead of flattening out beyond point "A," would tend to decrease beyond that point. The connection of conductor 63 could also be made to conductor 22, with similar results. I have found that with any of these embodiments a maximum voltage level can be predetermined and that the voltage regulating circuit would be in cut-off until this level was reached.

The choice of proper components and equivalents for this invention is guided by normal design practice. Thus, diodes 39 and 59 may be voltage-reference tubes, and triodes 37 and 55 may be combined in a twin triode. In place of gaseous diodes 39 and 59 it is possible to substitute other constant voltage means, such as separate D. C. supplies. Pentode 17 can be a beam power amplifier or a network of power amplifiers. Further, other electronic devices, such as transistors, may be substituted for the above-mentioned vacuum and gaseous electronic tubes.

This invention, in addition to eliminating undesirable voltage transients after the load is operated, also solves the problem of starting a cold load where the initial voltage would be too high.

It will be noted from the foregoing that there has been provided a simple and effective sytsem for maintaining a constant current supply which is converted into a maximum voltage supply when the load impedance (and voltage) rise above a pre-determined level.

Other advantages of the system of the present invention will occur to those skilled in the art to which it relates, and it should be understood that changes therein may be made without the exercise of invention and within the scope of the claims appended hereto.

I claim:

1. An electrical system comprising a source of energy, a grid-controlled regulating tube, a load device, and means responsive to the load energy for applying to the grid of the regulating tube a control potential; said means comprising two load-shunting circuits, each having a control tube whose plate current determines said grid potential, said plate current of the control tube of one of said circuits varying in response to changes in load impedance current; the control tube of said one circuit being conductive in a selected operating range and tending to maintain a constant current in the load; the plate current of the control tube of the other of said circuits varying in response to changes in load impedance voltage drop, the control tube of said other circuit being conductive only when the load impedance voltage drop rises above a predetermined level and, when conductive, tending to maintain a constant voltage across the load.

2. An electrical system comprising a source of energy, a grid-controlled regulating tube, a load device, a resistance connected in series with said load device, a resistive network connected in parallel with said load device, and means responsive to the load current for applying to the grid of the regulating tube a control potential; said means comprising two load-shunting circuits, each having a control tube whose plate current determines said grid potential, said plate current of the control tube of one of said circuits varying in response to changes in load current; the control tube of said one circuit having a grid bias normally allowing plate current flow and regulated by the change in potential occasioned by a change in load current flowing through said resistance; the control tube of said other circuit having its grid bias normally cutoff and its grid connected to said resistive network across which a potential proportional to the load voltage is derived.

3. An electrical system comprising a source of energy, a grid-controlled regulating tube, a load device having a load potential, $E_L$, a load current, $I_L$, a resistance, $R_1$, in series with said load device, a resistive network including a resistance, $R_2$ and a resistance, $R_3$, and connected in parallel with said load device, and means responsive to the load energy for applying to the grid of the regulating tube a control potential; said means comprising two load-shunting circuits, each having a control tube whose plate current determines said grid potential; the control tube of one of said circuits having a grid bias equal to $I_LR_1$ less a constant voltage; said other circuit having its grid potential supplied from a junction between resistance, $R_2$, and resistance, $R_3$, and having its grid bias equal to $$\frac{R_2}{R_2+R_3}E_L$$

less a constant voltage, said control tube of said other circuit being conductive only when said load potential exceeds a predetermined value.

4. An electrical system comprising a source of energy, a regulating tube having a control grid, a load, a first resistance in series with said load, and a second resistance in shunt with said load; the potential of said control grid being derived from an independent source of fixed potential, means including a circuit containing a first control tube whose grid-cathode bias is regulated by the potential drop across said second resistance for deriving a first control potential responsive to current through said load, means including a circuit containing a second control tube whose grid-cathode bias is regulated by the potential drop across said second resistance for deriving a second control potential responsive to the voltage drop across said load; said second control tube being conductive only when the load voltage exceeds a predetermined value.

5. An electrical system comprising a source of energy, a regulating tube having a control grid, and a load in series with said regulating tube, said control grid being biased by potential from a load-shunting circuit containing an independent source of fixed potential, a first resistance in series with said load, a second resistance in shunt with said load, a first path containing a first control tube, and a second path in parallel with said first path and containing a second control tube; said first control tube having its grid-cathode bias regulated by the potential drop across said first resistance; said second control tube having a grid-cathode bias regulated by the potential drop across said second resistance, said second control tube being conductive only when the load voltage exceeds a predetermined amount.

6. An electrical system comprising a source of energy, a regulating tube having a control grid, a load and a first resistance in series with said load, a second resistance in shunt with said load; the potential of said control grid being derived from an independent fixed potential, means including a first control tube whose grid-cathode bias is regulated by the potential drop across said first resistance for deriving a first control potential responsive to current through said load, and means including a second tube whose grid-cathode bias is regulated by the potential drop across said second resistance for deriving a second control potential responsive to the voltage drop across said load; said second resistance being selected so as to maintain said latter control tube at cutoff below a predetermined load impedance voltage drop.

References Cited in the file of this patent

UNITED STATES PATENTS

| | | |
|---|---|---|
| 2,206,123 | Rinia et al. | July 2, 1940 |
| 2,449,739 | Duttera | Sept. 21, 1948 |
| 2,468,850 | Trucksess | May 3, 1949 |